US006848263B2

United States Patent
Hafner et al.

(10) Patent No.: US 6,848,263 B2
(45) Date of Patent: Feb. 1, 2005

(54) SETTING SYSTEM FOR AN AIR-CONDITIONER IN A VEHICLE

(75) Inventors: Ernst Hafner, Hagnau (DE); Peter Bubb, Gröbenzell (DE); Matthias Götz, Munich (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 0 days.

(21) Appl. No.: 10/238,184

(22) Filed: Sep. 10, 2002

(65) Prior Publication Data

US 2003/0070437 A1 Apr. 17, 2003

(30) Foreign Application Priority Data

Sep. 11, 2001 (DE) .......................................... 101 44 635

(51) Int. Cl.⁷ .............................. F25B 49/00; F23N 1/00
(52) U.S. Cl. ........................................ 62/127; 236/94
(58) Field of Search ...................... 62/127, 239; 236/94; 454/69; 200/175, 308

(56) References Cited

U.S. PATENT DOCUMENTS 5,559,301 A 9/1996 Bryan, Jr. et al.
5,861,589 A * 1/1999 Sato et al. .................. 200/5 R

FOREIGN PATENT DOCUMENTS

| DE | 3843454 C1 | 6/1990 |
| DE | 9110348 U1 | 1/1992 |
| DE | 19807410 A1 | 8/1999 |
| DE | 19810451 A1 | 9/1999 |

* cited by examiner

*Primary Examiner*—Chen Wen Jiang
(74) *Attorney, Agent, or Firm*—Tarolli, Sundheim, Covell & Tummino L.L.P.

(57) ABSTRACT

A setting system for a vehicle air-conditioner is provided. The setting system allows for individual settings coupled with ergonomic functionality. The setting system comprises a control panel with a touch-sensitive display screen connected to a microcomputer-based controller having control outputs at least to a fan unit, to air distribution valves and to temperature adjusters of the air-conditioner. The display screen is adapted to display current settings and available setting options of at least (i) air flow rate, (ii) air distribution and (iii) air temperature, in the form of analog symbol representations that respond to tactile contact to vary current settings.

8 Claims, 8 Drawing Sheets

Representation of the display principle (1)

· Left-hand vertical arrow: heat on the left, above/below it, the field displaying the temperature value for the left-hand seat
· Right-hand vertical arrow: heat on the right, above/below it, the field displaying the temperature value for the right-hand seat
· Left-hand triangle: air volume distributed equally over all of the vents (33% head vent, 33 % foot vent and 33% chest vent)
· Right-hand triangle: air volume distributed 100% via the chest vent
· Horizontal arrow: display of the air volume in percent

Fig. 1

Fig. 2 Representation of the display principle (1)

- Left-hand vertical arrow: heat on the left, above/below it, the field displaying the temperature value for the left-hand seat
- Right-hand vertical arrow: heat on the right, above/below it, the field displaying the temperature value for the right-hand seat
- Left-hand triangle: air volume distributed equally over all of the vents (33% head vent, 33 % foot vent and 33% chest vent)
- Right-hand triangle: air volume distributed 100% via the chest vent
- Horizontal arrow: display of the air volume in percent

Fig. 5

Representation of the display principle (4)

- Temperature on the left lowered to 16.9°C [62.42°F]
- Air volume reduced to 20%
- Left-hand triangle: air volume distributed 30% via the head vent and 70% via the foot vent
- Right-hand triangle: air volume distributed 70% via the head vent and 30% via the foot vent

Fig. 7

Touchpad operation: air distribution / position of the active field

Shifting the focal point
- to the left: increase in the air volume in the chest area. New focal point position is displayed on the appertaining display
- to the right: air volume is distributed via the head vent and the foot vent
- downward: air volume is distributed via the chest vent and the foot vent
- upward: air volume is distributed via the head vent and the chest vent
· The right-hand triangle shows that the outflow is comming only from the chest vent
· End of the selection procedure either by removing one's hand or by double clicking
· Mode for ending is set in the system menu
· The active field for the temperature selection is shown in dark gray with a broken line

Fig. 8

Touchpad operation: air volume selection / position of the active field

- Shifting the "bar" to the right: air volume increase. New bar position and newly selected air volume are displayed on the appertaining display
- End of selection procedure either by removing one's hand or by double clicking
- Mode for ending is set in the system menu
- The active field for the temperature selection is shown in dark gray with a broken line

SETTING SYSTEM FOR AN AIR-CONDITIONER IN A VEHICLE

FIELD OF THE INVENTION

The present invention relates to a setting system for an air-conditioner in a vehicle.

BACKGROUND OF THE INVENTION

With increasing automation of complex comfort features in vehicle air-conditioners, an individual setting is becoming more and more complicated and difficult. For example, certain settings, such as an individual air volume distribution, are no longer possible at all with most air-conditioners in vehicles. They are simply replaced by standard settings such as "Normal" or "Automatic", "Defrost", "Top" and "Bottom". Except for the "Normal" or "Automatic" setting, these options are of a limited value: none of them is useful for more than just a short period of time. Clearly, there is a lack of ergonomics in conventional setting systems for vehicle air-conditioners.

SUMMARY OF THE INVENTION

The invention provides a setting system for a vehicle air-conditioner that allows for individual settings coupled with ergonomic functionality. The setting system comprises a control panel with a touch-sensitive display screen connected to a microcomputer-based controller having control outputs at least to a fan unit, to air distribution valves and to temperature adjusters of the air-conditioner. The display screen is adapted to display current settings and available setting options of at least (i) air flow rate, (ii) air distribution and (iii) air temperature, in the form of analog symbol representations that respond to tactile contact to vary current settings. With the inventive setting system, a user readily understands, upon a simple glance onto the display screen, the current settings and also the available setting options. By just contacting an analog symbol representation on the display screen with a fingertip and moving within the available surface area of that symbol representation, a current setting is changed and immediately visualised.

In a preferred embodiment, the analog symbol representations each comprise a geometric figure defining a continuous surface that represents a continuous range of available setting values, and a current setting value is depicted by a visually accentuated marking within said continuous surface. Based on just a few geometric figures such as triangles and slider-bars, a user easily recognises on the display screen the current settings and the available setting options.

In an advantageous embodiment of the invention, it is assumed that the volume of air that is distributed through the usual three vents for the head, chest and foot areas always amounts to 100%. This air volume has to be divided into percentages for air flow to the head, chest and foot areas. A currently set air distribution is depicted by a "weighted focal point" in an equilateral triangle. The corners of the triangle symbolically stand for the three air spaces, head, chest and foot area. The position of the focal point within the surface area of the triangle then stands for the percentage distribution to each of these areas. When the "weighted focal point" is shifted within the triangle, this is understood by the controller as a command to modify the current air distribution setting, and appropriate control signals will be sent to corresponding air distribution valves of the air-conditioner.

BRIEF DESCRIPTION OF DRAWINGS

Further features and advantages of the invention ensue from the following description with reference to the accompanying drawings. In the drawings.

DETAILED DESCRIPTION OF PREFERRED EMBODIMENTS

Figure 1:
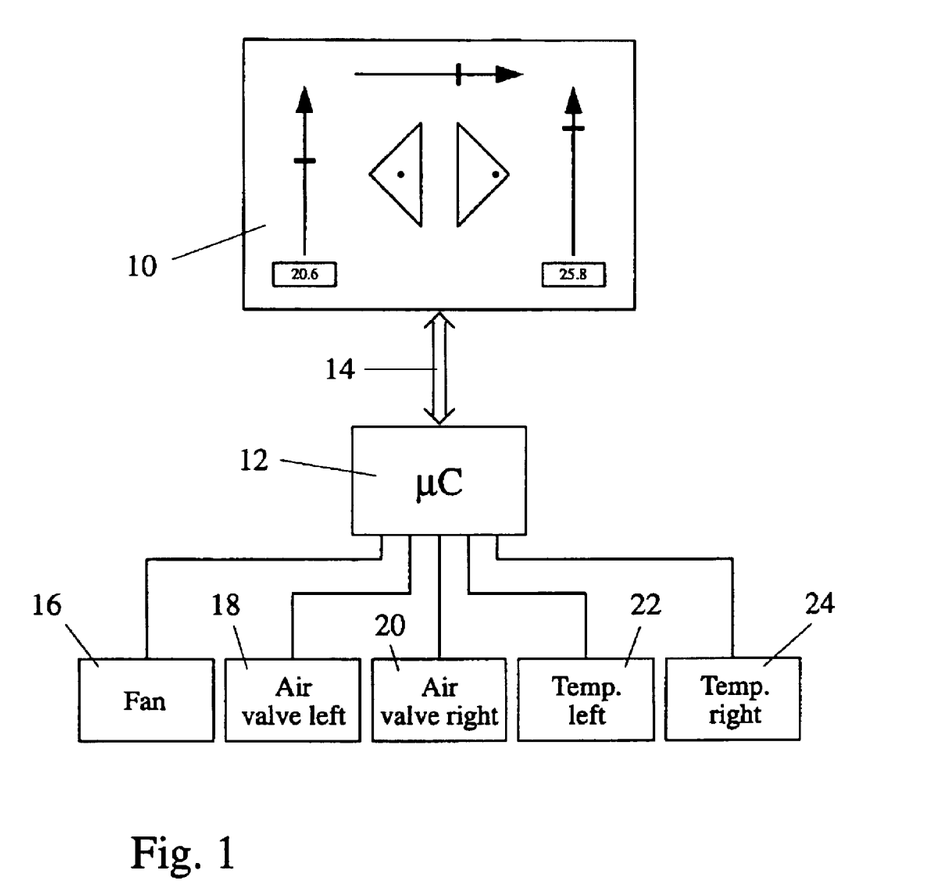
FIG. 1 is a block diagram of the inventive setting system.

With reference to FIG. 1, a setting system for a vehicle air-conditioner is shown schematically. Integrated into the dashboard of the vehicle is a control panel 10. Control panel 10 is a touch-sensitive display screen. Control panel 10 displays symbol representations for temperature and air volume settings, as will be explained below in further detail. Control panel 10 is connected to a microcomputer-based controller 12 through a bus 14. Controller 12 has outputs for driving a fan unit 16, control outputs to left-hand and right-hand air valve units 18, 20 and control outputs to left-hand and right-hand temperature adjusters 22, 24.

Figure 2:
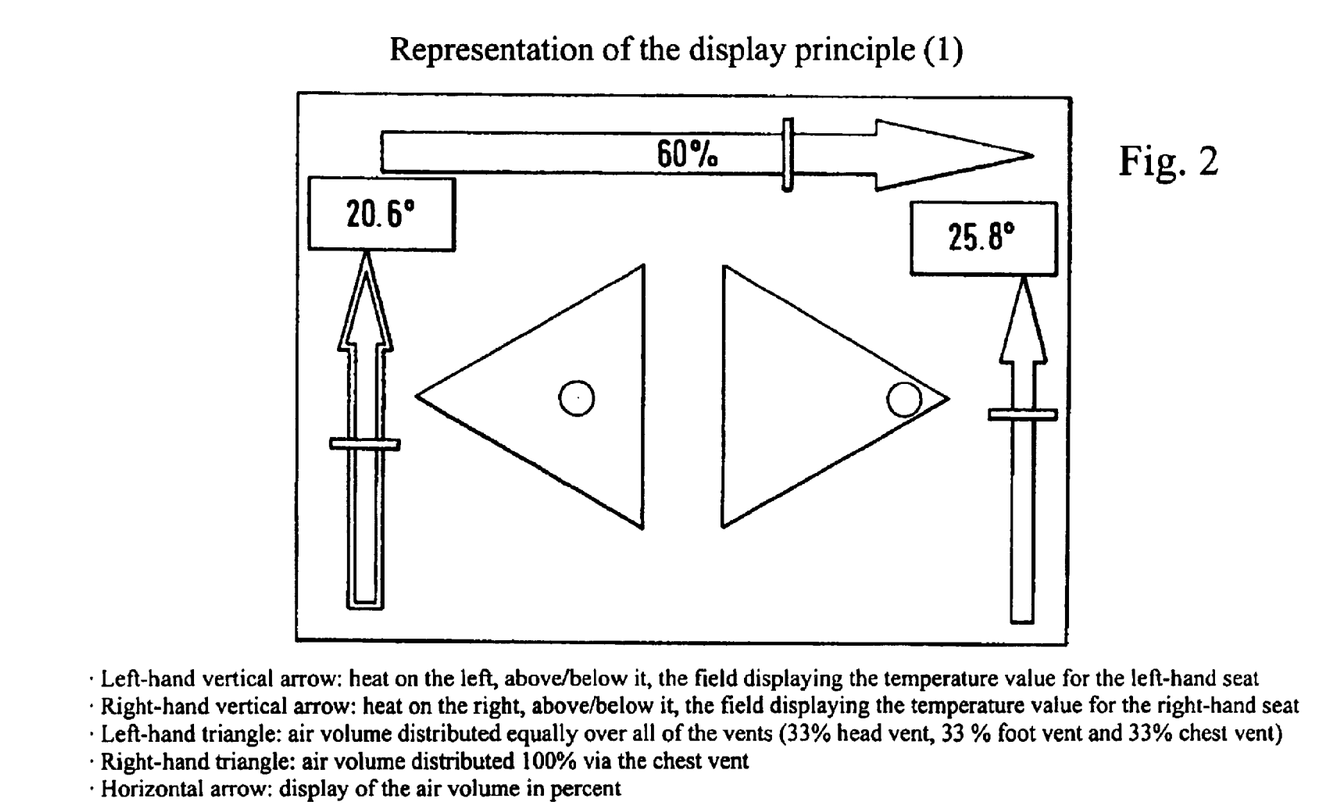
FIGS. 2 to 5 show different settings appearing on a touch-sensitive display screen of the system.
Figure 3:
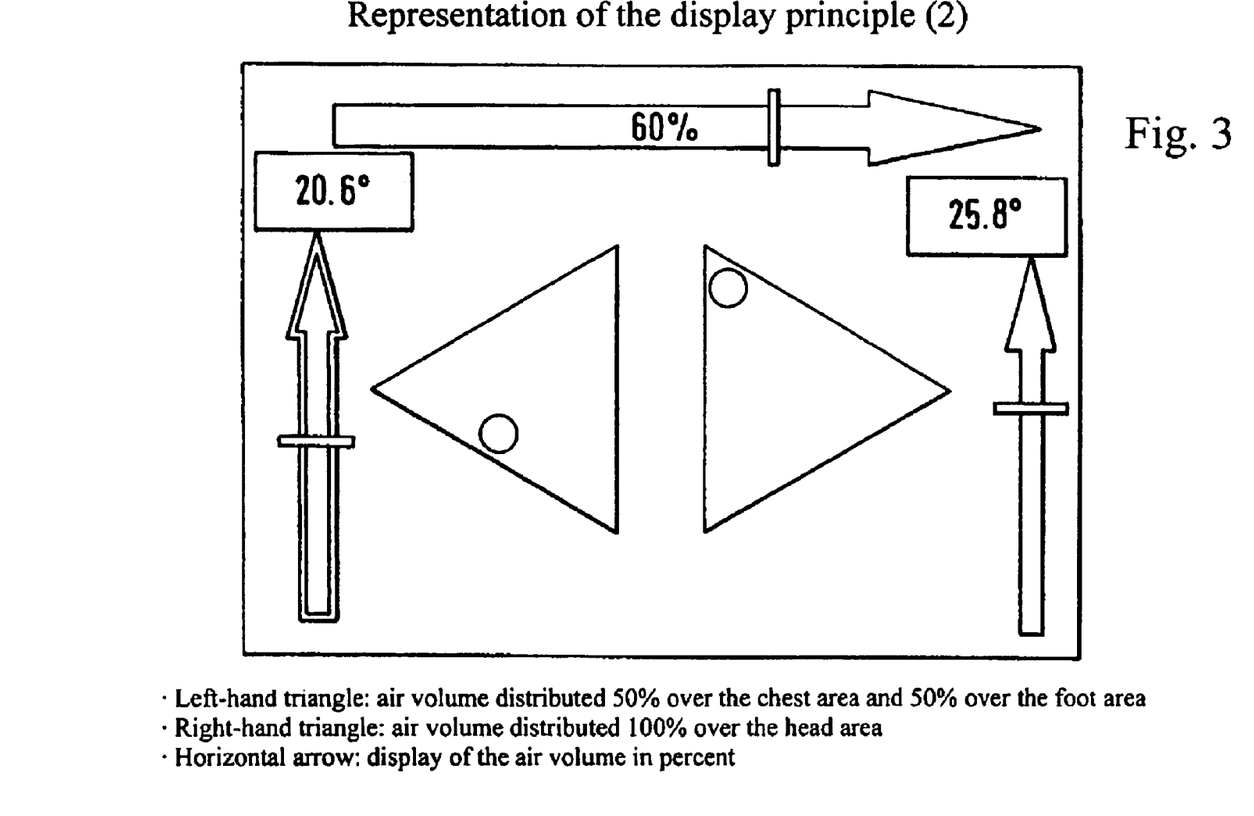
Figure 4:
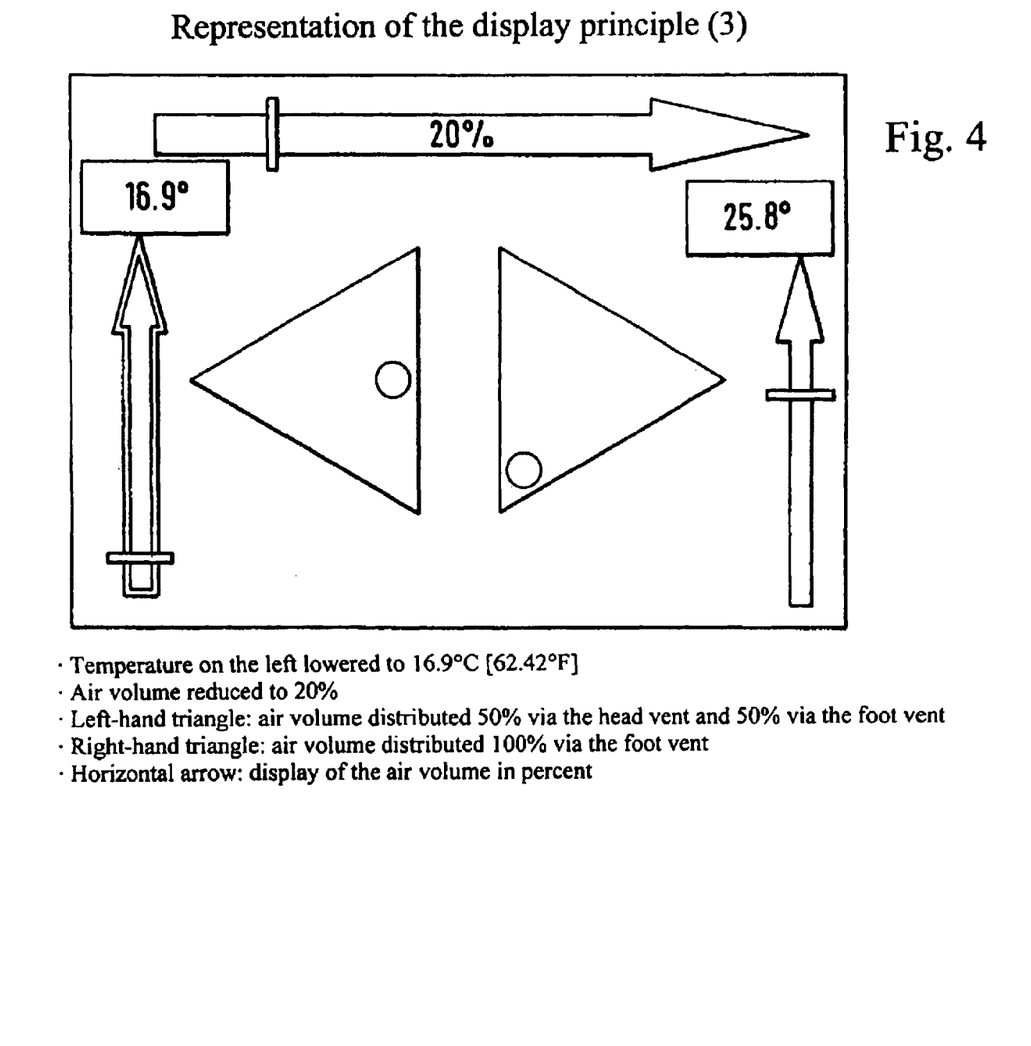
Figure 5:
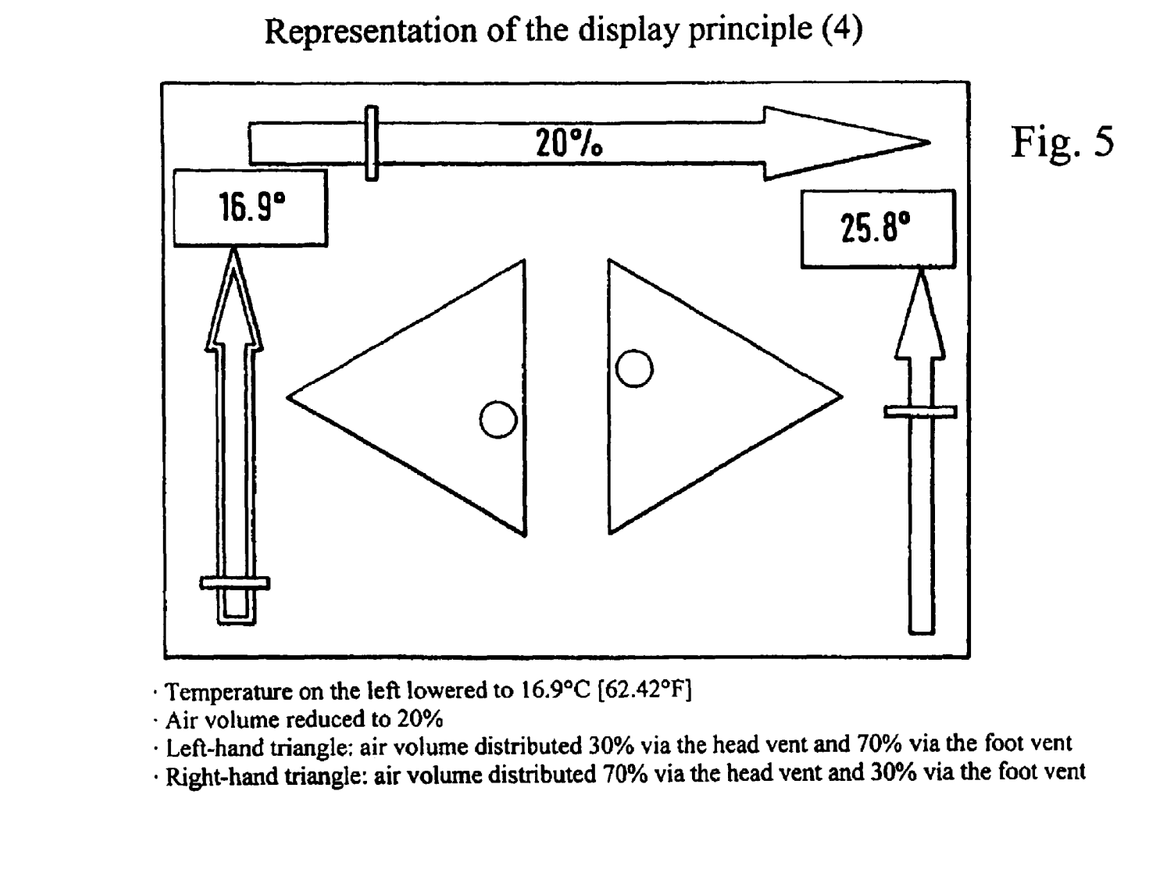

With reference to FIG. 2, the symbol representations on control panel 10 include tow arrow-shaped vertical slider-bar symbols for the left-hand and right-hand temperature settings, one horizontal arrow-shaped slider-bar symbol for the total air volume and two triangles each with a dot to represent the currently set air distribution on the left-hand and right-hand sides. Each of the slider-bar symbols for the temperatures is associated with a numerical display field where the current temperature settings are displayed numerically. The slider-bar symbol for the air volume is associated with a numerical display field indicating the current setting as a percentage of total available volume. The dot in each of the triangular symbols is indicative of the current air distribution between the head, foot and chest vents. The closer the dot is to any of the tree corners in a triangle, the more air will be discharged from corresponding air vents. For example, in FIG. 2, the dot in the left-hand triangle is centered, indicating a balanced air distribution (33% head, 33% foot, 33% chest), and the dot in the right-hand triangle indicates a 100% setting for the chest vents. Other examples are readily apparent from FIGS. 3–5.

Figure 6:
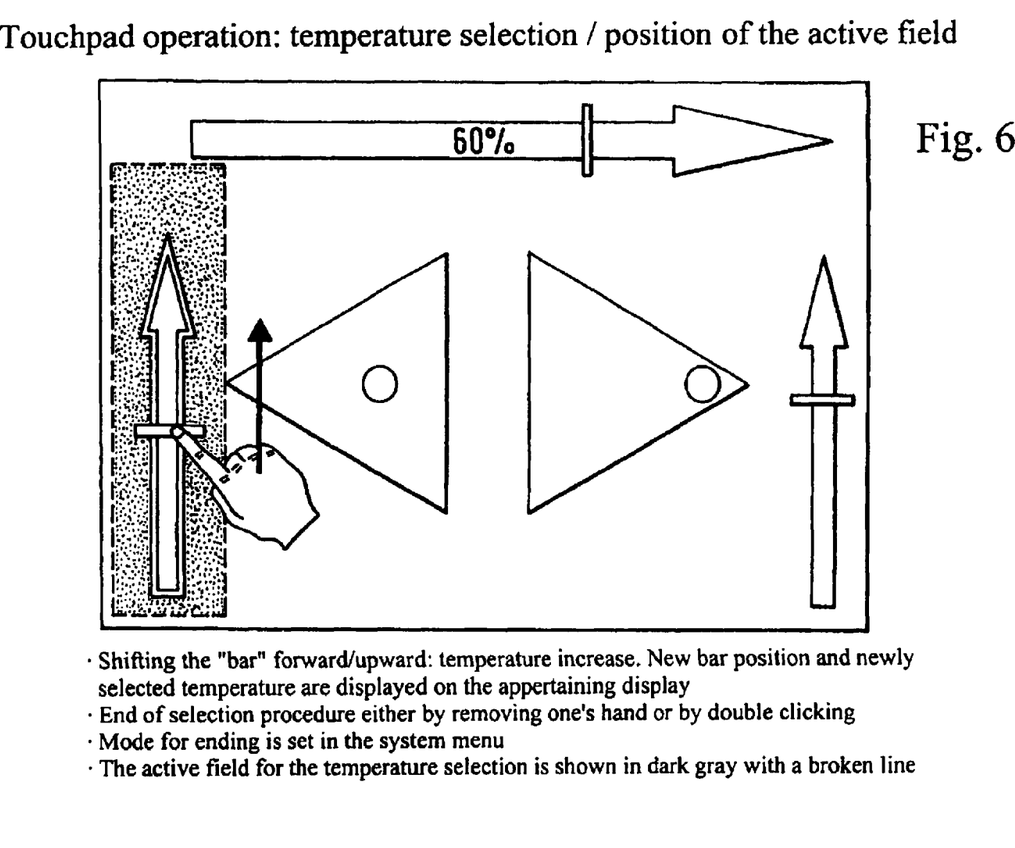
FIGS. 6, 7 and 8 show details of operating conditions for the touch-sensitive display screen.
Figure 7:
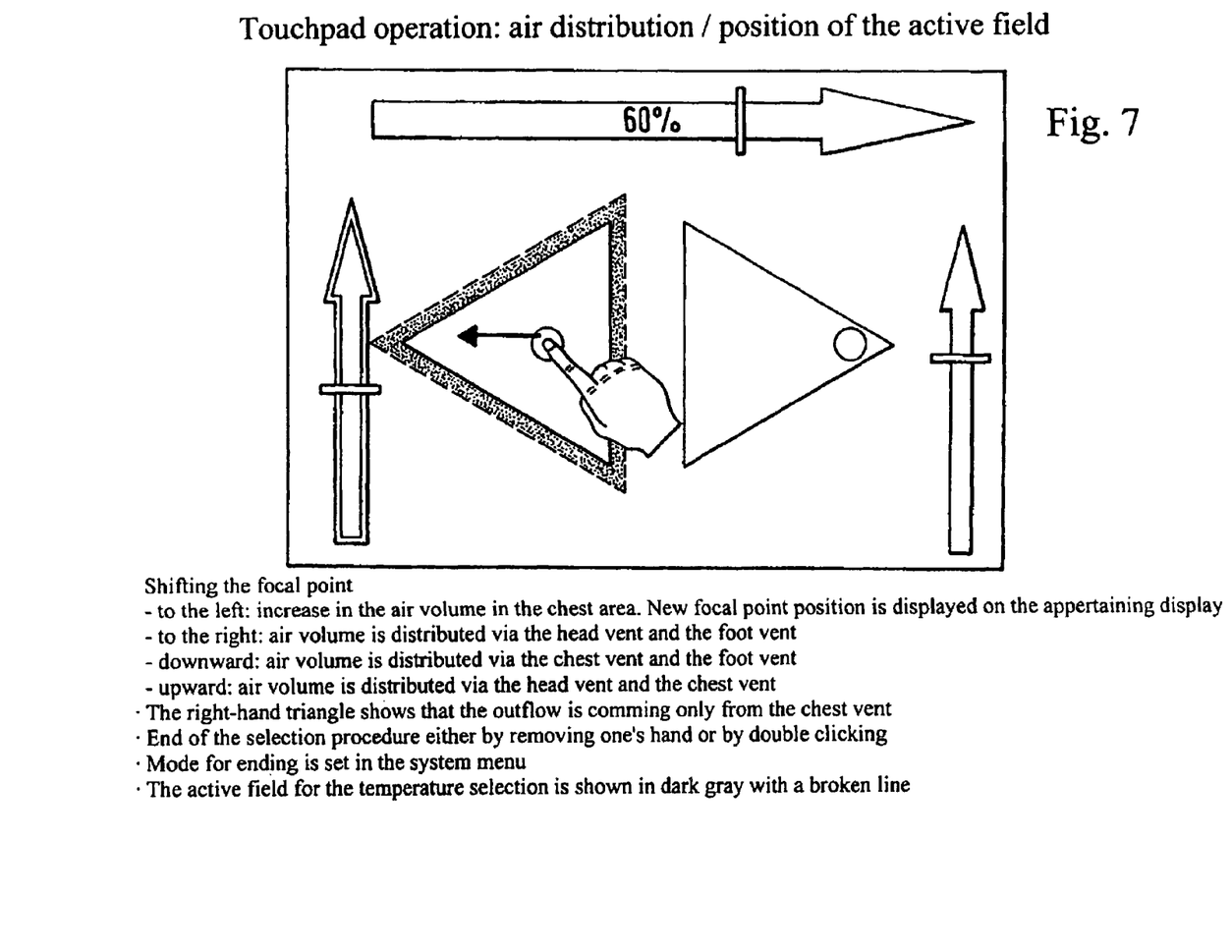
Figure 8:
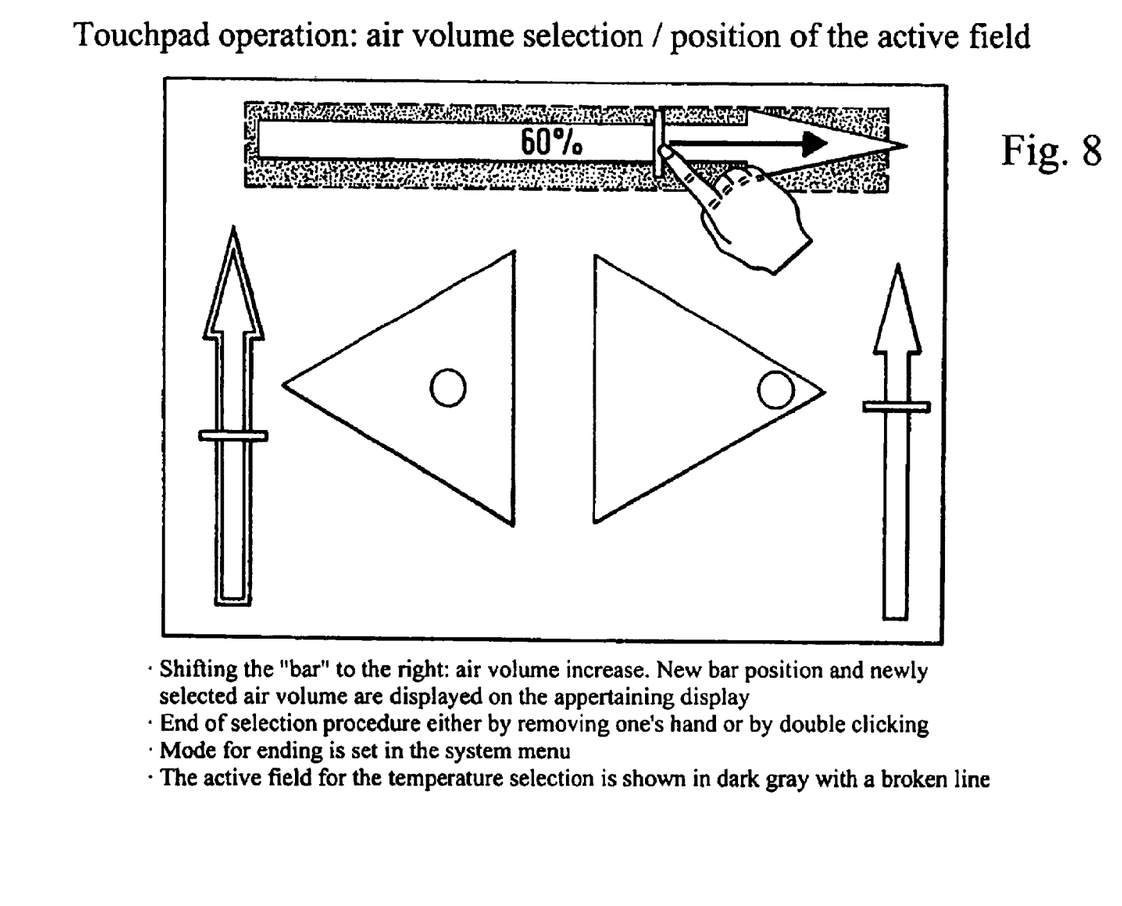

To change any of the current settings, the corresponding symbol on control panel 10 is touched with a fingertip. The symbol is highlighted to indicate it is active for adjustment. For example, in FIG. 6, the left-hand slider-bar ist touched and the bar is "moved" upwards to increase the temperature value. In FIG. 7, the dot in the left-hand triangle is touched and "moved" to the left to increase the proportion of air volume from the chest vents. In FIG. 8, the horizontal slider-bar is touched and the bar "moved" to the right to increase the total air volume supplied to all vents. In all cases, completion of an adjustment may be signalled by a "double-click", or by just removing the fingertip from control panel 10. The settings in each of the symbols on control panel 10 are interpreted by controller 12 and converted into appropriate control signals for the fan unit 16, the left-hand and right-hand air valve units 18, 20 and the left-hand and right-hand temperature adjusters 22, 24.

What is claimed is:

1. A setting system for an air-conditioner in a vehicle, comprising a control panel with a touch-sensitive display screen connected to a microcomputer-based controller having control outputs at least to a fan unit, to air distribution valves and to temperature adjusters of the air-conditioner, wherein said display screen is adapted to display current settings and available setting options of at least air flow rate, air distribution and air temperature in the form of analog symbol representations that respond to tactile contact to vary current settings.

2. The setting system according to claim 1, wherein the analog symbol representations each comprise a geometric figure defining a continuous surface that represents a continuous range of available setting values, and a current setting value is depicted by a visually accentuated marking within said continuous surface.

3. The setting system according to claim 2, wherein a current setting of air distribution is represented by a dot within the surface area of a triangle.

4. The setting system according to claim 2, wherein the analog symbol representation comprises a slider-bar.

5. The setting system according to claim 4, wherein the slider-bar is generally arrow-shaped.

6. The setting system of claim 4, wherein the slider-bar is associated with a digital display field that displays a numerical value of a current setting.

7. The setting system according to claim 4, wherein a temperature setting is represented by the slider-bar.

8. The setting system according to claim 4, wherein an air flow rate setting is represented by the slider-bar.

* * * * *

UNITED STATES PATENT AND TRADEMARK OFFICE
CERTIFICATE OF CORRECTION

PATENT NO.    : 6,848,263 B2
DATED         : February 1, 2005
INVENTOR(S)   : Ernst Hafner, Peter Bubb and Matthias Götz

It is certified that error appears in the above-identified patent and that said Letters Patent is hereby corrected as shown below:

Column 3,
Line 5, claim 2 should read as follows:
   -- 2. A setting system for an air-conditioner in a vehicle, comprising a control panel with a touch-sensitive display screen connected to a microcomputer-based controller having control outputs at least to a fan unit, to air distribution valves and to temperature adjusters of the air-conditioner, wherein said display screen is adapted to display current settings and available setting options of at least
      air flow rate,
      air distribution, and
      air temperature
in the form of analog symbol representations that respond to tactile contact to vary current settings,
   said analog symbol representations each comprising a geometric figure defining a continuous surface that represents a continuous range of available setting values, a current setting value being depicted by a visually accentuated marking within said continuous surface. --

Column 4,
Line 1, after "wherein", change "the ($2^{nd}$ occurrence)" to -- one --.
Lines 3 and 5, after "wherein", change "the ($2^{nd}$ occurrence)" to -- said --.
Lines 9 and 11, after "by", change "the ($2^{nd}$ occurrence)" to -- said --.

Signed and Sealed this

Seventeenth Day of May, 2005

JON W. DUDAS
*Director of the United States Patent and Trademark Office*